(12) United States Patent
Berlandier

(10) Patent No.: US 10,592,809 B2
(45) Date of Patent: Mar. 17, 2020

(54) GUIDED ROW INSERTION

(71) Applicant: INTERNATIONAL BUSINESS MACHINES CORPORATION, Armonk, NY (US)

(72) Inventor: Pierre C. Berlandier, San Diego, CA (US)

(73) Assignee: International Business Machines Corporation, Armonk, NY (US)

( * ) Notice: Subject to any disclaimer, the term of this patent is extended or adjusted under 35 U.S.C. 154(b) by 514 days.

(21) Appl. No.: 15/331,253

(22) Filed: Oct. 21, 2016

(65) Prior Publication Data

US 2018/0114119 A1    Apr. 26, 2018

(51) Int. Cl.
*G06N 5/02* (2006.01)
*G06F 16/28* (2019.01)

(52) U.S. Cl.
CPC ........... *G06N 5/022* (2013.01); *G06F 16/284* (2019.01)

(58) Field of Classification Search
CPC .............................. G06N 5/022; G06F 16/284
See application file for complete search history.

(56) References Cited

U.S. PATENT DOCUMENTS

| | | | |
|---|---|---|---|
| 8,005,872 B2 | 8/2011 | Bhattacharjee et al. | |
| 9,104,713 B2 | 11/2015 | Iyer et al. | |
| 2007/0168640 A1* | 7/2007 | Hrle | G06F 16/24557 711/206 |
| 2011/0078103 A1* | 3/2011 | Teng | G06F 9/451 706/47 |
| 2014/0156609 A1* | 6/2014 | Christian | G06F 16/2282 707/693 |
| 2014/0172908 A1* | 6/2014 | Konik | G06F 16/951 707/769 |
| 2015/0213071 A1 | 7/2015 | Alvey et al. | |

OTHER PUBLICATIONS

Peter Mell et al., "The NIST Definition of Cloud Computing", National Institute of Standards and Technology, U.S. Department of Commerce, NIST Special Publication 800-145, Sep. 2011, 7 pages.

* cited by examiner

*Primary Examiner* — Li B. Zhen
*Assistant Examiner* — Henry Nguyen
(74) *Attorney, Agent, or Firm* — Robert J. Shatto, Esq.; George S. Blasiak, Esq.; Heslin Rothenberg Farley & Mesiti PC

(57) ABSTRACT

Methods, computer program products, and systems are presented. The methods computer program products, and systems can include, for instance: determining an insertion interval of a row for insertion into a decision table; and guiding insertion of the row for insertion into the decision table based on a result of the determining.

20 Claims, 8 Drawing Sheets

A: <Model="R8",Trim="Luxury",FactoryID="GYOR">

B: <Model="R8">

| I | Ordering Country | Model | Trim | Factory ID | Delivery (days) | Supplier ID |
|---|---|---|---|---|---|---|
| 1 | | in { A8, R8} | Luxury | | | AH21 |
| 2 | US | | Luxury | | | BY07 |
| 3 | US | | | INGOLSTADT | | IN18 |
| 4 | | Q7 | | | 30 | AH21 |
| 5 | | | Luxury | | | NT01 |
| 6 | | | Standard | | | NT02 |

FIG. 4

GUIDED ROW INSERTION

BACKGROUND

The present disclosure relates to decision logic, and more particularly to methods, computer program products, and systems for guided row insertion in a decision table.

In enterprise decision management (EDM) systems, decision tables are commonly used help the users express decision rules. Decision tables can include condition columns and action columns. For a given set of input values and a given row of a decision table, if the Boolean expression in each condition column is verified by the corresponding cell value in the row, then the actions in the action columns are executed, using the corresponding cell value in the row as parameter.

In some cases, the decision table is a dense matrix, where the set of rows are covering the whole space defined by the domain of the variables involved in the decision table columns. The rows in these tables are mutually exclusive, and only one row of the table will match a given set of input values.

In other cases, the decision table can be sparse. A decision table can involve a large number of data points, but not all data points are used by every row. These decision tables can be used to define configurations, which depend on multiple criteria, with different priorities or preferences among the criteria.

SUMMARY

Shortcomings of the prior art are overcome, and additional advantages are provided, through the provision, in one aspect, of a method including for example: determining, by the one or more processor, an insertion interval of a row for insertion into a decision table; and guiding, by the one or more processor, insertion of the row in the decision table based on a result of the determining.

In another aspect, a computer program product can be provided. The computer program product can include a computer readable storage medium readable by one or more processing unit and storing instructions for execution by one or more processor for performing a method. The method can include, for example: determining, an insertion interval of a row for insertion into a decision table; and guiding, insertion of the row in the decision table based on a result of the determining.

In a further aspect, a system can be provided. The system can include, for example a memory. In addition, the system can include one or more processor in communication with the memory. Further, the system can include program instructions executable by the one or more processor via the memory to perform a method. The method can include, for example: determining, an insertion interval of a row for insertion into a decision table; and guiding, insertion of the row in the decision table based on a result of the determining.

Additional features are realized through the techniques set forth herein. Other embodiments and aspects, including but not limited to computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 4 illustrates a decision table subject to row insertion requests according to one embodiment;

DETAILED DESCRIPTION

Figure 1:
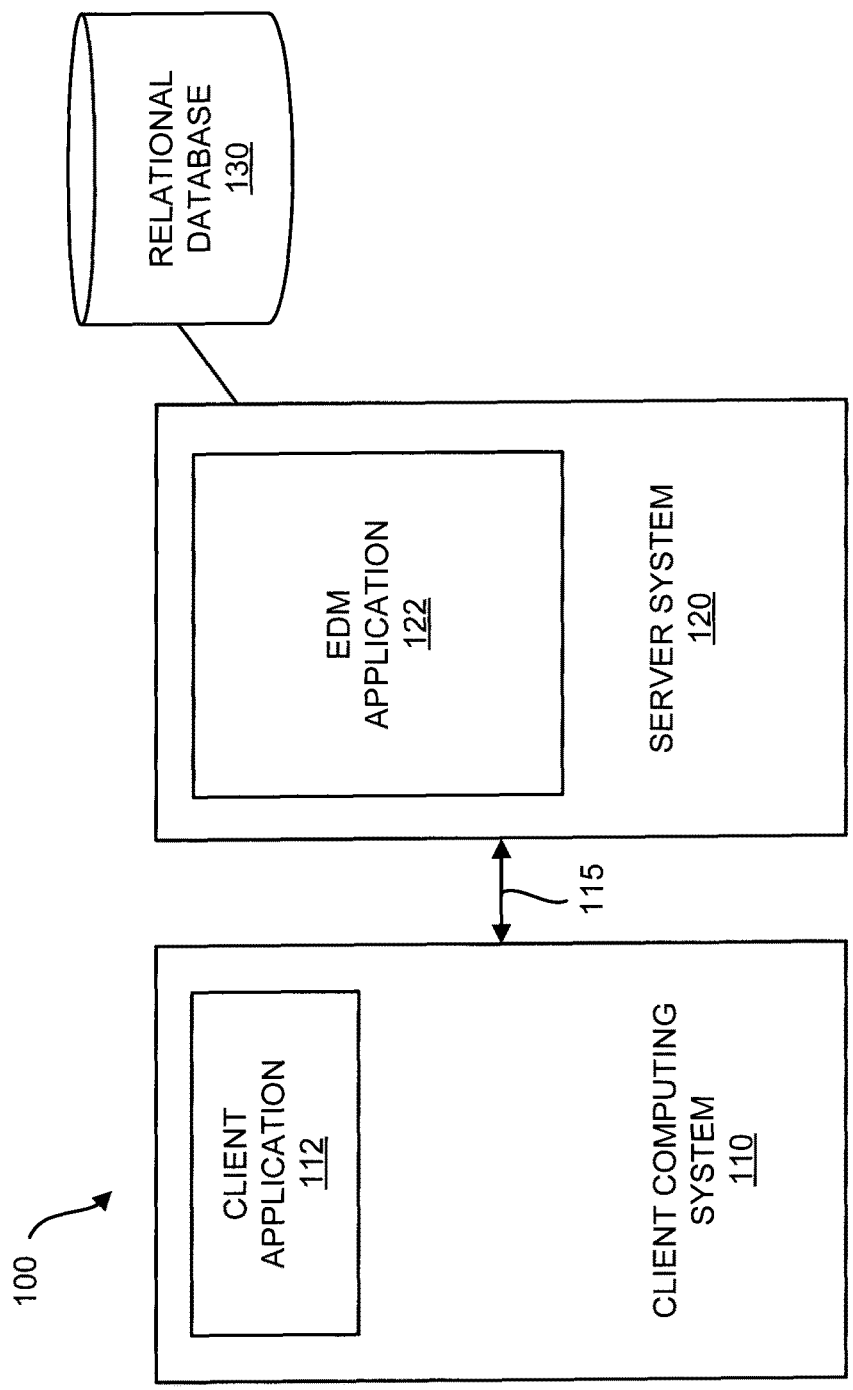
FIG. 1 is a schematic diagram of a computing infrastructure according to one embodiment for guiding insertion of a row into a decision table.

FIG. 1 illustrates a computing infrastructure 100 configured for managing database requests, according to one embodiment of the invention. As shown, the computing infrastructure 100 can include a client computing system 110 and a server system 120, in communication with one another via a communications network 115.

Illustratively, the client computing system 110 includes a client application 112 used to communicate with the server system 120 over the network 115 in order to submit database requests to the server system 120. Database requests can be defined by a user using a user interface provided by client application 112 at client computing system 110. Although shown as a single client computing system, the client computing system 110 is included to be representative of a single client or multiple clients. The server system 120 may include an enterprise decision management (EDM) application 122. EDM application 122 may process requests sent by the client computing system 110 to the server system 120. As part of processing client requests, the EDM application 122 may communication with relational database 130 that stores one or more decision table. Relational database 130 can be external to or can be co-located with server system 120.

In one embodiment, EDM application 122 can enforce properties of one or more decision table in relational database 130. For example, EDM application 122 can respond to requests by the client computing system 110 to insert or update records in the databases 130. In response to a request to insert a row in a decision table of database 130, EDM application 122 can determine a row insertion interval. EDM application 122 can further guide insertion of a row for input subject to a row insertion request. In one embodiment, EDM application 122 can manage one or more sparse decision table of database 130. A sparse decision table can involve a large number of data points, but not all data points are used by the different rows. Sparse decision tables can be used to define configurations which depend on multiple criteria, with different priorities among the criteria. For a given set of input values, multiple rows may apply. According to an execution semantics for a sparse decision table rows can be ordered in descending priority and only the first applicable row, starting from the top of the table, shall be applied. Execution semantics for a sparse decision table can conform to the first hit policy described by the Decision Model and Notation (DMN) standard published by the OBJECT MANAGEMENT GROUP (OMG).

Embodiments herein recognize that instances of decision tables commonly have hundreds of rows to accommodate complex configuration schemes and that insertion of new configuration rows is susceptible to human error. Embodiments herein recognize that a new configuration row will not be operative to control functioning of actions or will disable functioning of one or more table row under various conditions. Embodiments herein recognize for example that a new configuration row for insertion will not be active if the new configuration row has a less specific row before it. Embodiments herein recognize for example that a new configuration row for insertion will render inactive one or more subsequent row if the new row is less specific than the one or more subsequent row. Embodiments herein recognize that human authors that are configuring decision tables are not practically able to discern conditions that would render a decision table row inactive.

Figure 2:
FIG. 2 illustrates an exemplary decision table that may result from deficiencies of an enterprise decision management system addressed by features herein.

For example, referring to decision table 200 of FIG. 2 embodiments herein recognize that the row indexed as Index 2, in decision table 200 is an invalid and inactive row that is never activated. Embodiments herein recognized that insertion of the row indexed as Index 2 as shown in FIG. 2, would result in the row indexed as Index 2 being never fired as the row indexed as Index 2 is more specific and therefore subsumed by the row indexed as Index 1.

Figure 3:
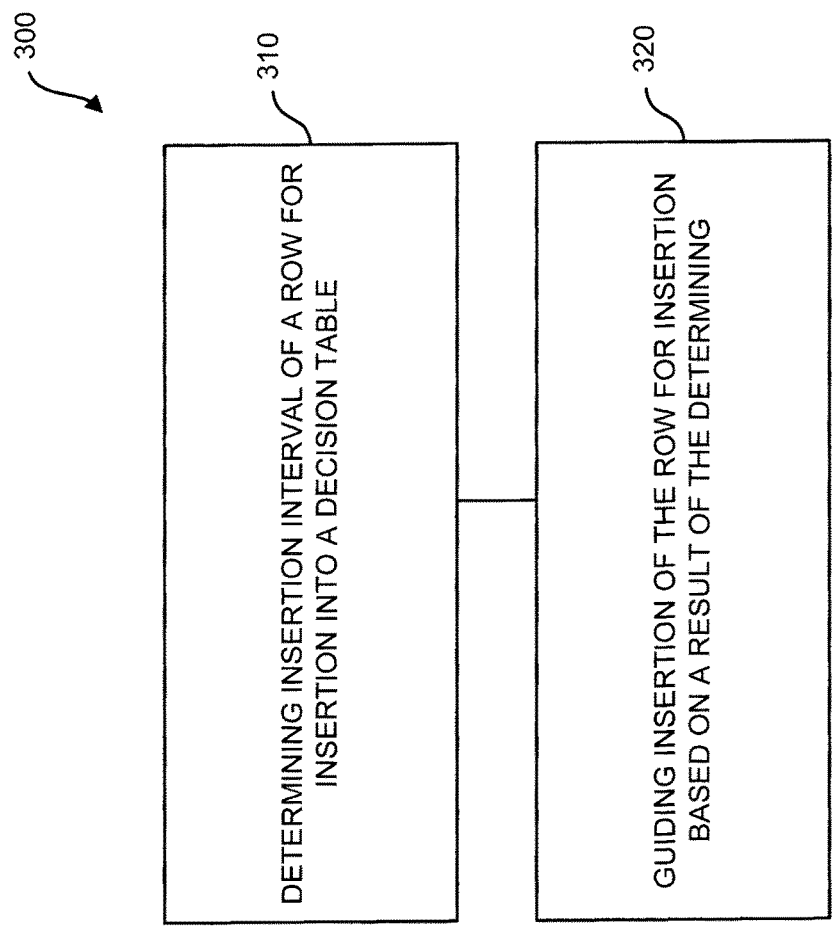
FIG. 3 is a flowchart illustrating a method according to one embodiment.

For avoiding configuring of a decision table 200 to include inactive rows, method 300 as set forth in the flowchart of FIG. 3 can be performed. In one embodiment, method 300 can be performed by EDM application 122.

Referring to the method 300 as set forth in the flowchart of FIG. 3 method 300 can include at block 310 determining an insertion interval of a row for insertion into a decision table; and at block 320 can include guiding insertion of the row for insertion into the decision table based on a result of the determining.

In one embodiment determining at block 310 can include use of a comparison operator that compares a row for input to a row of a decision table. In one embodiment guiding at block 320 can include controlling a user interface e.g. by communicating with client application 112 to configure client application 112. Method 300 can be applied to configure a decision table for use in an arbitrary decision process.

Determining of an insertion interval at block 310 can rely on a comparison operator which can be referred to the operator: SUBSUMES. According to method 300 the operator SUBSUMES can be applied between two decision table rows.

Operation definition. In one embodiment, the operator SUBSUMES can be defined as follows. Row1 SUBSUMES Row2 when, for each condition cell of Row1 (a) and (b) are true: (a) If the cell has a defined value, then the corresponding cell in Row2 also has a defined value; (b) The value (or domain of values) of the cell equals (or includes) the value (or domain of value) of the corresponding cell in Row2.

Note that the provided definition means that Row2 may have more cells with a defined value than Row1.

Example 1

Using the operator SUBSUMES defines as described, an algorithm for determining at block 310 the interval of indices in which to insert the new row can be defined by the following pseudo-code:

- Let newRow be the row to insert in the decision table
- Let firstRowIndex be the index of the first row in the decision table
- Let lastRowIndex be the index of the last row in the decision table

```
set startInsertionIndex to firstRowIndex
set endInsertionIndex to lastRowIndex + 1
for i in [lastRowIndex . . . firstRowIndex ]
do
  set currentRow to the row in the decision table at index i
  if (newRow SUBSUMES currentRow) and (currentRow SUBSUMES newRow)
  then
    startInsertionIndex = i
    endInsertionIndex = i
    break
  else if (newRow SUBSUMES currentRow)
  then
    startInsertionIndex = i + 1
    break;
  else if (currentRow SUBSUMES newRow)
  then
    endInsertionIndex = i
end-for
```

[END OF EXAMPLE 1]

As seen by the exemplary pseudocode of EXAMPLE 1, the operator SUBSUMES can be applied bi-directionally between a row for insertion and each row of a decision table until an index interval has been defined for the row of insertion. A row for insertion can be compared to each row of a decision table using the SUBSUMES operator on a sequential basis until the row for insertion has been compared to each row of the decision table.

Using the determining process of the pseudocode of EXAMPLE 1, the configuration row A: <Model="R8", Trim="Luxury", Factory ID="GYOR"> for insertion in decision table 220 (FIG. 4) would result in:

startInsertionIndex=1
endInsertionIndex=1 meaning that this new row should be inserted as the first row of the table. Applying the process of the pseudocode process of EXAMPLE 1 it will be seen that comparison of configuration row A for insertion using the SUBSUMES operand will yield a SUBSUMES=YES return unless configuration row A is inserted at the Index=1 location. Inserting configuration row A at Index=1 assures that each row of the decision table 220 remain capable of being fired (activated).

Using the determining process of the pseudocode of EXAMPLE 1, the configuration row B: <Model="R8"> for insertion in decision table 220 (FIG. 4) would result in:

startInsertionIndex=2
endInsertionIndex=7 meaning that the new row should be inserted in any location from the second row to after the last one. Applying the process of the pseudocode process of EXAMPLE 1 it will be seen that comparison of configuration row B for insertion using the SUBSUMES operand to rows of decision table 220 will yield a SUBSUMES=YES return unless configuration row A is inserted at the Index=1 location. Inserting configuration row B at Index=2 through 7 assures that each row of the decision table 220 remain capable of being fired (activated).

According to method 300 on an insertion interval being determined at block 310, guiding can be performed at block 320. For performing guiding at block 320 in one embodiment EDM application 122 can communicate with client application 112 to configure client application 112 for control of one or more user interface feature thereof. In one embodiment, EDM application 122 at block 320 can configure application 112 so that a user using a user interface displayed by client application 112 at client computer 110 is restricted from requesting inserting a new configuration row at row indices, other than the rows determined at block 310 to be included in the valid row insertion interval. In another aspect EDM application 122 at block 320 can configure client application 112 so that a displayed user interface displays a prompt prompting the user to request configuration row insertion only at the valid index interval determined at block 310.

Figure 5:
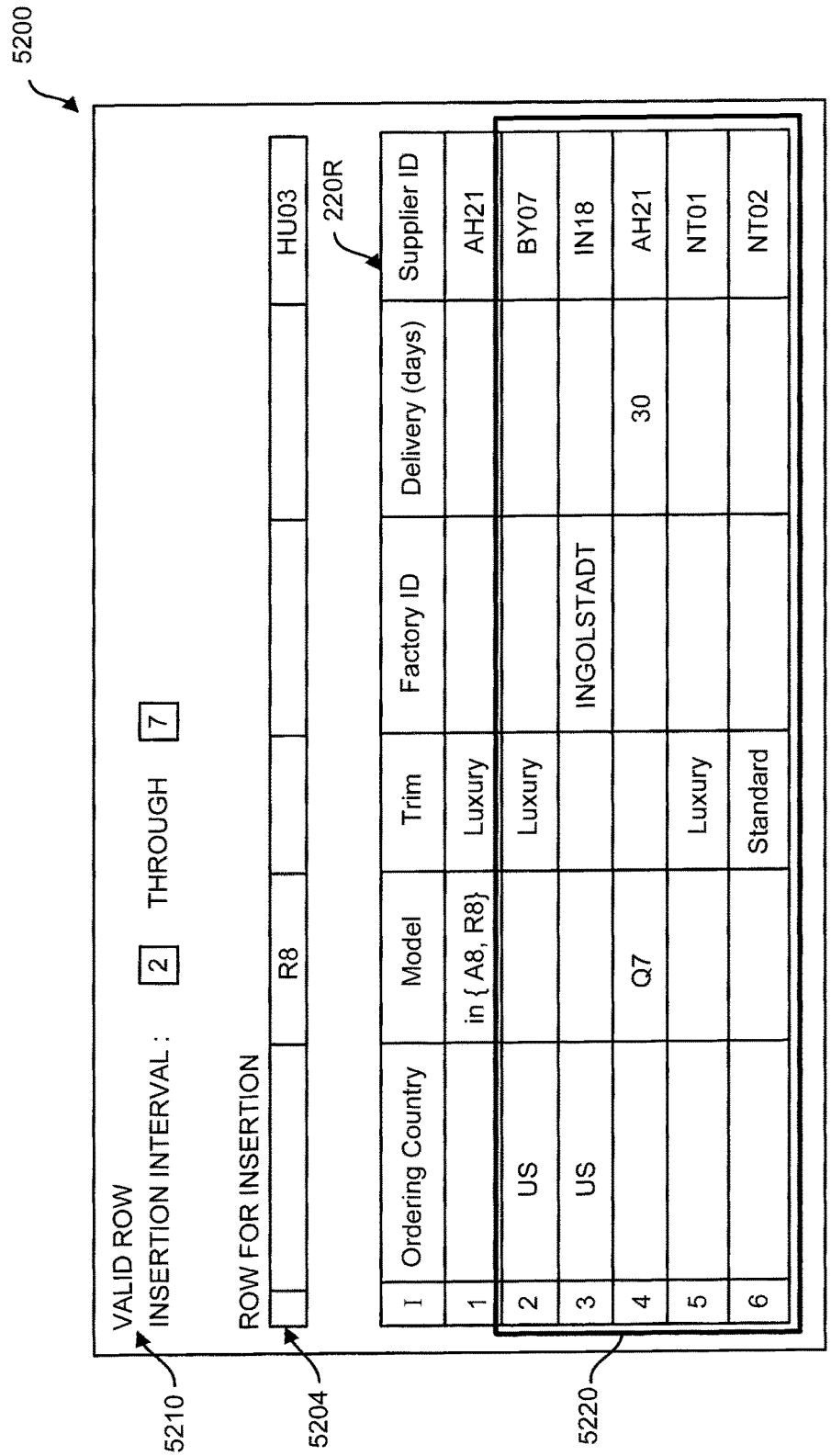
FIG. 5 illustrates a user interface guiding row insertion according to one embodiment.

An exemplary displayed user interface 5200 displayed by client application 112 on a display of client computer 110 responsively to communications from EDM application 122 is shown at FIG. 5. Referring to user interface 5200, user interface 5200 can include a representation 220R being subject to configuration and area 5204 allowing a user to define rows for insertion and row insertion requests. In the example of FIG. 5 decision table representation 220R corresponds to decision table 220 referred to in FIG. 3. In one aspect as set forth herein based on one or more configuration communication from EDM application 122 to client application 112, a user may be restricted from defining row insertion requests for row indices determined to be invalid at block 310. In another aspect as set forth herein based on one or more configuration communication from EDM application 122 to client application 112 a prompt e.g. in the form of text prompt 5210 may be presented at user interface prompting the user acting as a decision table author to define an insertion request only at decision table rows within the determined value row insertion interval determined at block 310. In one aspect for guiding row insertion EDM application 122 can send one or more configuration communication to client application 112 so that valid index row insertion intervals for insertion are indicated by a highlight 5220 which can be displayed in association with decision table representation 220R. Highlight 5220 can include e.g. one or more of a special graphic feature (e.g. a box around the valid index row insertion interval as shown), font, or color. Highlight 5220 can highlight rows of displayed decision table representation 220R of a decision table 220 (FIG. 3) for which a row for insertion is being defined.

In one embodiment, EDM application 122 can be operative to serve dynamic webpages and client application 112 can include web browser functionality and can be operative to display webpages served by EDM application. In one embodiment, user interface 5200 for display on a display of client computer system 110 can be provided by one or more dynamic webpage served by EDM application 122 and displayed by client application 112. Configuration communications sent by EDM application 122 to client application 112 can be provided in response to user inputs input into user interface 5200. In one embodiment, EDM application 122 can be operative to recognize user entry of data into any of the second through sixth fields of area 5204 as a defining of a row for insertion. EDM application 122 can be operative to recognize user entry of data into the first field of area 5204 (the Index ("I") field) with user entry of data into any of the second through sixth fields of area 5204 as a defining of a row for insertion. In one embodiment, in response to any changes entered by a user in the second through sixth fields of area 5204, EDM application 1222 can perform determining at block 310 to determine a valid row insertion interval and can responsively send one or more communication to client application 112 to update prompt 5210 and/or highlight 5220. As a user enters a row index in the first field of area 5204 to indicate the desired row index for the currently defined row for insertion, EDM application 122 can respond to the input in accordance with the currently determined row insertion interval determined at block 310 for the currently defined row for insertion. If the user enters an index into the first field of area 5204 to define a row insertion request, and the index is within the range of indices determined to be valid indices of the insertion interval determined at block 310, EDM application 122 can implement the row insertion request so that a new row is inserted into the decision table 220 (FIG. 3) represented by decision table representation 220R. If the user enters an index into the first field of area 5204 to define a row insertion request, and the index is not within the range of indices determined to be valid indices of the insertion interval determined at block 310, EDM application 122 can restrict the row insertion request so that a new row is not inserted into the decision table 220 (FIG. 3) represented by decision table representation 220. Restricting of a row insertion request can include one or more communication from EDM application 122 to client application 112 to provide feedback to user to indicate that the row insertion request has been restricted. For example, EDM application 122 can send one or more communication to client application 112 to lock out area 5204 e.g. by prevent display of any invalid row index entered into the first field of area 5204.

In another aspect according to method 300, a decision table e.g. decision table 220 can be simplified to remove redundant rows. In one aspect a newly inserted row can be queried together with adjacent rows. If the actions of the newly inserted row are identical to the actions of the row just preceding it in the table and the new row subsumes the preceding row (SUBSUMES=YES on application of the SUBSUMES operator) the preceding row can be removed from the decision table. If the actions of the newly inserted row are identical to the actions of the row just following it in the decision table and the new row is subsumed by the following row (SUBSUMES=YES on application of the SUBSUMES operator) the new row can be removed from the decision table.

Certain embodiments herein may offer various technical computing advantages, including a method for determining an insertion interval for a configuration row for insertion into a decision table and guiding insertion of row based in the determining. Combinations herein provide a method to determine the insertion point of a new row in a decision table by providing the range of row indices in which the row should be inserted so that relevance of remaining rows in the table is preserved. Combinations herein provide technical computing advantages in one aspect by providing for configuration of a decision table in a manner so that generation invalid rows is avoided particularly in cases of a sparse decision table where rows are not mutually exclusive, and are subject to a first hit policy. Rows can be evaluated in sequence from first to last. Combinations herein simplify the task of creating and maintaining these decision tables by providing a method to determine the proper interval of indices where to insert a new row in a decision table, so that the relevance of existing rows is preserved. Combinations herein can provide a post-processing function that simplifies the decision table when applicable. Combinations herein make decision table authoring and maintenance easier for users and reduces the testing and debugging cycle time, supporting quick updates of decision policies in the enterprise with high accuracy and efficiency.

Figure 6:
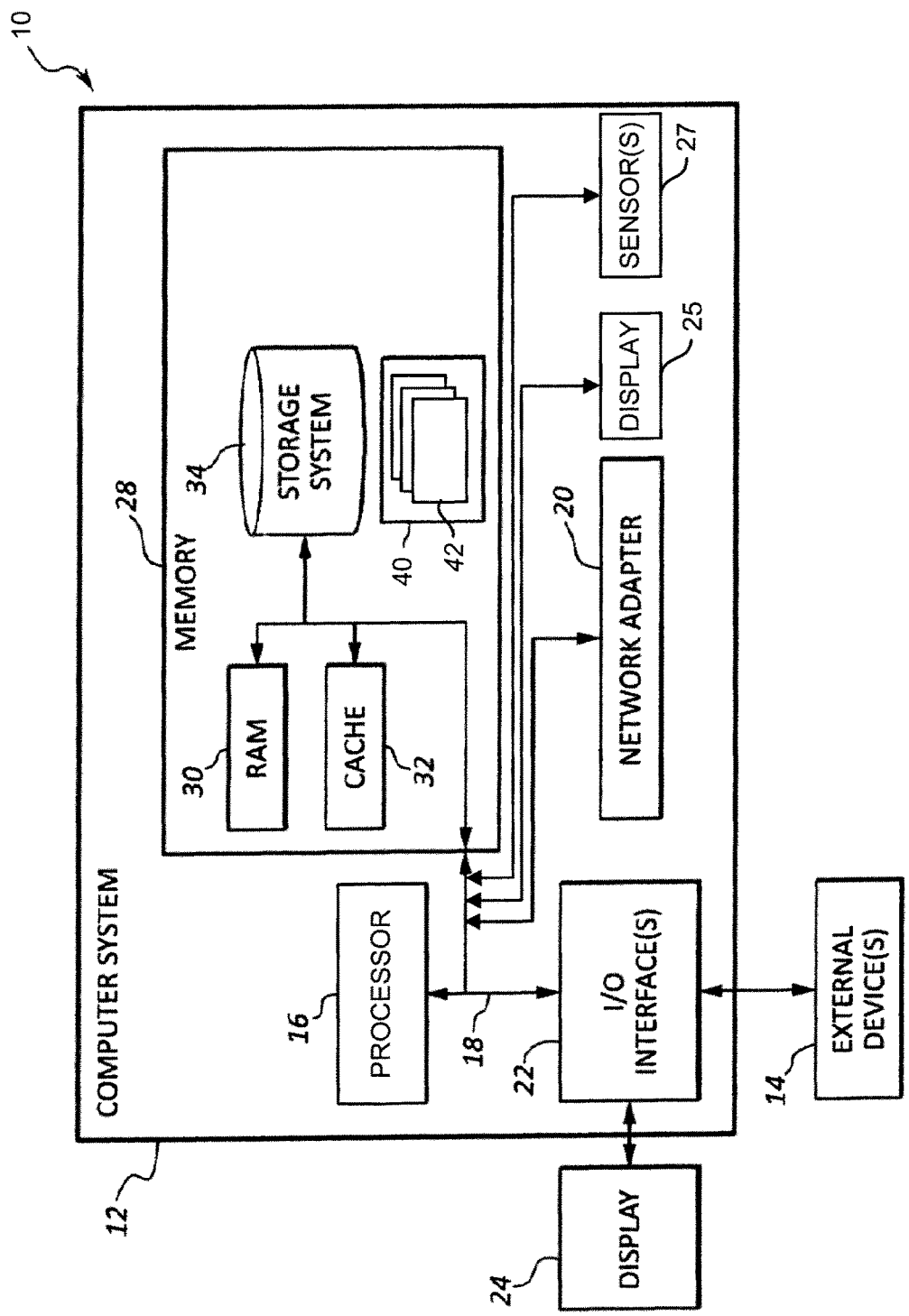
FIG. 6 illustrates a computing node according to one embodiment.
Figure 7:
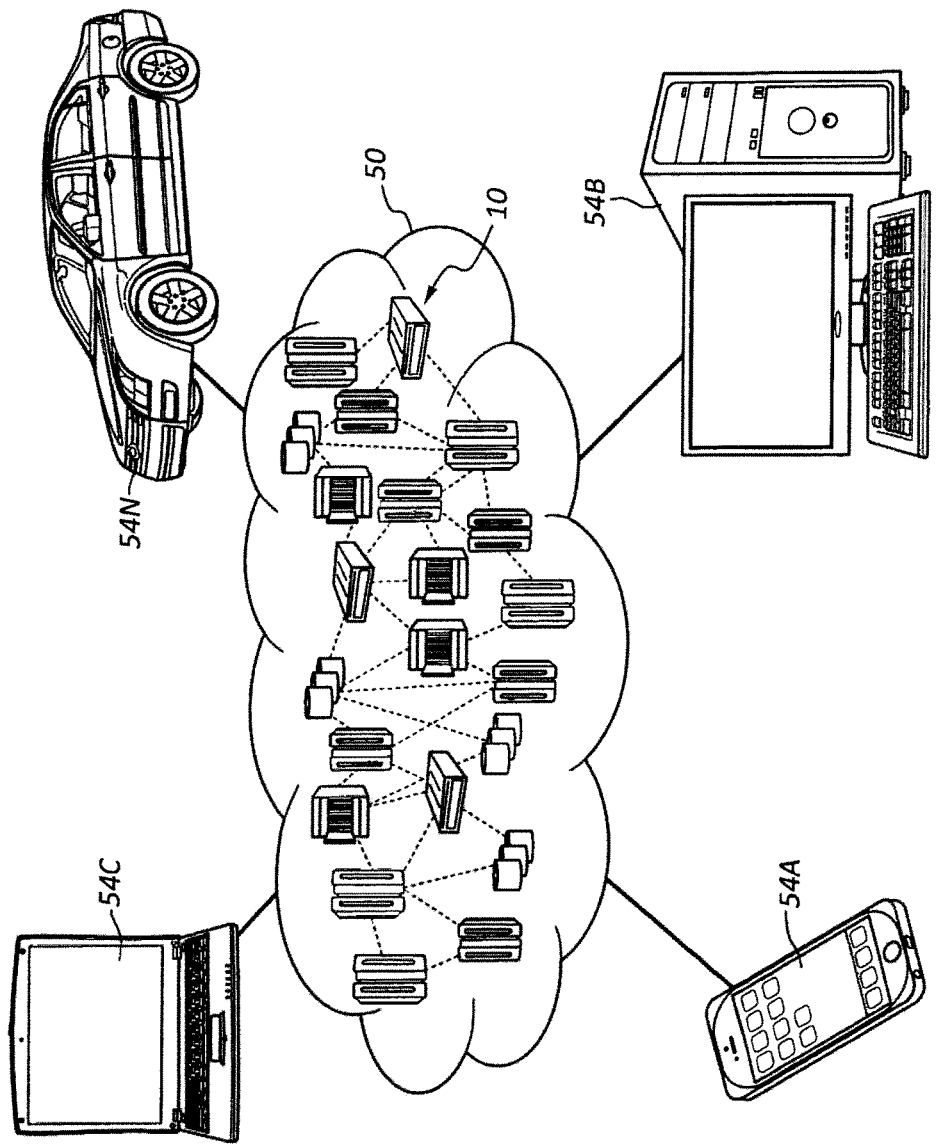
FIG. 7 depicts a cloud computing environment according to one embodiment.
Figure 8:
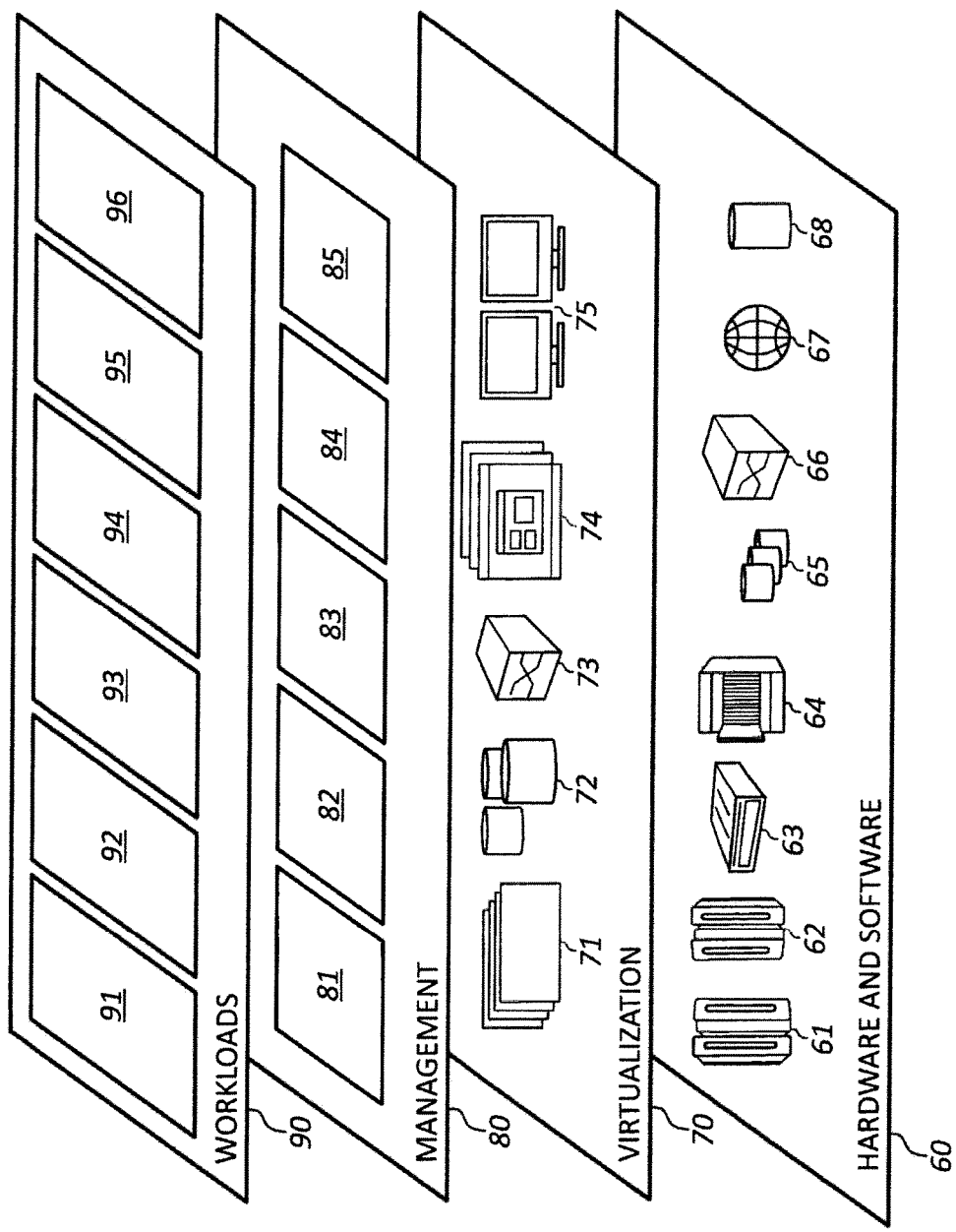
FIG. 8 depicts abstraction model layers according to one embodiment.

FIGS. 6-8 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 6, a schematic of an example of a computing node 10 is shown. Computing node 10 is only one example of a computing node and is not intended to suggest any limitation as to the scope of use or functionality of embodiments of the invention described herein. Regardless, computing node 10 is capable of being implemented and/or performing any of the functionality set forth hereinabove. Computing node 10 can be implemented as a cloud computing node in a cloud computing environment, or can be implemented as a computing node in a computing environment other than a cloud computing environment. Each of client computer system 110, server system 120, can include one or more computing node 10. Database 130 can include one or more computing node 10 external to or co-located with server system 120.

In computing node 10 there is can be included a computer system 12, which is operational with numerous other general purpose or special purpose computing system environments or configurations. Examples of computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 6, computer system 12 in computing node 10 is shown in the form of a general-purpose computing device. The components of computer system 12 may include, but are not limited to, one or more processor 16, a system memory 28, and a bus 18 that couples various system components including system memory 28 to processor 16. In one embodiment, computing node 10 is a computing node of a non-cloud computing environment. In one embodiment, computing node 10 is a computing node of a cloud computing environment as set forth herein in connection with FIGS. 7-8.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. One or more program 40 including program processes 42, can generally carry out functions and/or methodologies of embodiments of described herein including functions attributable to EDM application 122 set forth in reference to FIG. 1 and method 300 set forth with reference to the flowchart of FIG. 3.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc. In addition to or in place of having external devices 14 and display 24, which can be configured to provide user interface functionality, computing node 10 in one embodiment can include display 25 connected to bus 18. In one embodiment, display 25 can be configured as a touch screen display and can be configured to provide user interface functionality. Computer system 12 in one embodiment can also include one or more sensor device 27 connected to bus 18. One or more sensor device 27 can alternatively be connected through I/O interface(s) 22. One or more sensor device 27 can include a Global Positioning Sensor (GPS) device in one embodiment and can be configured to provide a location of computing node 10. In one embodiment, one or more sensor device 27 can alternatively or in addition include, e.g., or more of a camera, a gyroscope, a temperature sensor, a humidity sensor or an audio input device. In reference to FIG. 7 computing node 10 can be implemented in a cloud computing environment and accordingly is referenced as a cloud computing node in the context of FIG. 7.

Referring now to FIG. 7, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Referring now to FIG. 8, a set of functional abstraction layers provided by cloud computing environment 50 (FIG. 6) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing for determining a valid row insertion interval 96 as described herein. The processing components 96 can be understood as one or more program 40 described in FIG. 5.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A method comprising:

determining, by one or more processor, an insertion interval of a row for insertion into a decision table; and guiding, by the one or more processor, insertion of the row for insertion into the decision table based on a result of the determining, wherein the determining includes comparing the row for insertion to respective rows of plurality of rows of the decision table to determine for each respective row of the plurality of rows whether the row for insertion is more specific or less specific than the respective row, wherein the decision table is configured so that a certain row of the decision table is not capable of being fired if there is a less specific row in the decision table ordered before the certain row, wherein the determining is performed so that that each of the plurality of rows is capable of being fired, wherein the determining and guiding are performed to restrict a user from causing insertion of the row for insertion into the decision table at a row order of the decision table at which the row for insertion is incapable of being fired, wherein the determining and guiding are performed to restrict a user from causing insertion of the row for insertion into the decision table at a row order of the decision table that would render a certain row of the decision table other than the row for insertion incapable of being fired, wherein the guiding includes restricting insertion of a row for insertion at row indices other than the determined row insertion interval, prompting a user to define a row insertion request for the determined row insertion interval, and highlighting a row representation of rows of the row insertion interval.

2. The method of claim 1, wherein the decision table is a sparse decision table.

3. The method of claim 1, wherein the determining includes applying a SUBSUMES operator defined as follows: Row1 SUBSUMES Row2 when, for each condition cell of Row1 (a) and (b) are true: (a) If the cell has a defined value, then the corresponding cell in Row2 also has a defined value; (b) The value (or domain of values) of the cell equals (or includes) the value (or domain of value) of the corresponding cell in Row2.

4. The method of claim 1, wherein the determining is performed so that subsequent to insertion of the row for insertion into the decision table, each row of the decision table is capable of being fired.

5. The method of claim 1, wherein the decision table is a sparse decision table, wherein the determining includes applying a SUBSUMES operator defined as follows: Row1 SUBSUMES Row2 when, for each condition cell of Row1 (a) and (b) are true: (a) If the cell has a defined value, then the corresponding cell in Row2 also has a defined value; (b) The value (or domain of values) of the cell equals (or includes) the value (or domain of value) of the corresponding cell in Row2.

6. The method of claim 1, wherein the determining is performed so that subsequent to insertion of the row for insertion into the decision table, each row of the decision table is capable of being fired, wherein the determining includes applying a SUBSUMES operator defined as follows: Row1 SUBSUMES Row2 when, for each condition cell of Row1 (a) and (b) are true: (a) If the cell has a defined value, then the corresponding cell in Row2 also has a defined value; (b) The value (or domain of values) of the cell equals (or includes) the value (or domain of value) of the corresponding cell in Row2.

7. The method of claim 1, wherein the decision table is a sparse decision table, wherein the determining is performed so that subsequent to insertion of the row for insertion into the decision table, each row of the decision table is capable of being fired.

8. A computer program product comprising:
a computer readable storage medium readable by one or more processing unit and storing instructions for execution by one or more processor for performing a method comprising:
determining an insertion interval of a row for insertion into a decision table; and
guiding insertion of the row for insertion into the decision table based on a result of the determining, wherein the determining includes comparing the row for insertion to respective rows of plurality of rows of the decision table to determine for each respective row of the plurality of rows whether the row for insertion is more specific or less specific than the respective row, wherein the decision table is configured so that a certain row of the decision table is not capable of being fired if there is a less specific row in the decision table ordered before the certain row, wherein the determining is performed so that that each of the plurality of rows is capable of being fired, wherein the determining and guiding are performed to restrict a user from causing insertion of the row for insertion into the decision table at a row order of the decision table at which the row for insertion is incapable of being fired, wherein the determining and guiding are performed to restrict a user from causing insertion of the row for insertion into the decision table at a row order of the decision table that would render a certain row of the decision table other than the row for insertion incapable of being fired, wherein the guiding includes restricting insertion of a row for insertion at row indices other than the determined row insertion interval, prompting a user to define a row insertion request for the determined row insertion interval, and highlighting a row representation of rows of the row insertion interval.

9. The computer program product of claim 8, wherein the decision table is a sparse decision table.

10. The computer program product of claim 8, wherein the determining includes applying a SUBSUMES operator defined as follows: Row1 SUBSUMES Row2 when, for each condition cell of Row1 (a) and (b) are true: (a) If the cell has a defined value, then the corresponding cell in Row2 also has a defined value; (b)The value (or domain of values) of the cell equals (or includes) the value (or domain of value) of the corresponding cell in Row2.

11. The computer program product of claim 8, wherein the determining is performed so that subsequent to insertion of the row for insertion into the decision table, each row of the decision table is capable of being fired.

12. The computer program product of claim 8, wherein the decision table is a sparse decision table, wherein the determining includes applying a SUBSUMES operator defined as follows: Row1 SUBSUMES Row2 when, for each condition cell of Row1 (a) and (b) are true: (a) If the cell has a defined value, then the corresponding cell in Row2 also has a defined value; (b) The value (or domain of values) of the cell equals (or includes) the value (or domain of value) of the corresponding cell in Row2.

13. computer program product of claim 8, wherein the determining is performed so that subsequent to insertion of the row for insertion into the decision table, each row of the decision table is capable of being fired, wherein the determining includes applying a SUBSUMES operator defined as follows: Row1 SUBSUMES Row2 when, for each condition cell of Row1 (a) and (b) are true: (a) If the cell has a defined value, then the corresponding cell in Row2 also has a defined value; (b) The value (or domain of values) of the cell equals (or includes) the value (or domain of value) of the corresponding cell in Row2.

14. The computer program product of claim 8, wherein the decision table is a sparse decision table, wherein the determining is performed so that subsequent to insertion of the row for insertion into the decision table, each row of the decision table is capable of being fired.

15. A system comprising:
a memory;
at least one processor in communication with the memory; and
program instructions executable by one or more processor via the memory to perform a method comprising:
determining an insertion interval of a row for insertion into a decision table; and
guiding insertion of the row for insertion into the decision table based on a result of the determining, wherein the determining includes comparing the row for insertion to respective rows of plurality of rows of the decision table to determine for each respective row of the plurality of rows whether the row for insertion is more specific or less specific than the respective row, wherein the decision table is configured so that a certain row of the decision table is not capable of being fired if there is a less specific row in the decision table ordered before the certain row, wherein the determining is performed so that that each of the plurality of rows is capable of being fired, wherein the determining and guiding are performed to restrict a user from causing insertion of the row for insertion into the decision table at a row order of the decision table at which the row for insertion is incapable of being fired, wherein the determining and guiding are performed to restrict a user from causing insertion of the row for insertion into the decision table at a row order of the decision table that would render a certain row of the decision table other than the row for insertion incapable of being fired, wherein the guiding includes restricting insertion of a row for insertion at row indices other than the determined row insertion interval, prompting a user to define a row insertion request for the determined row insertion interval, and highlighting a row representation of rows of the row insertion interval.

16. The system of claim 15, wherein the determining includes applying a SUBSUMES operator defined as follows: Row1 SUBSUMES Row2 when, for each condition cell of Row1 (a) and (b) are true: (a) If the cell has a defined value, then the corresponding cell in Row2 also has a defined value; (b)The value (or domain of values) of the cell equals (or includes) the value (or domain of value) of the corresponding cell in Row2.

17. The system of claim 15, wherein the determining is performed so that subsequent to insertion of the row for insertion into the decision table, each row of the decision table is capable of being fired.

18. The system of claim 15, wherein the decision table is a sparse decision table.

19. The system of claim 15, wherein the determining is performed so that subsequent to insertion of the row for insertion into the decision table, each row of the decision table is capable of being fired, wherein the determining includes applying a SUBSUMES operator defined as follows: Row1 SUBSUMES Row2 when, for each condition cell of Row1 (a) and (b) are true: (a) If the cell has a defined value, then the corresponding cell in Row2 also has a defined value; (b) The value (or domain of values) of the cell equals (or includes) the value (or domain of value) of the corresponding cell in Row2.

20. The system of claim 15, wherein the decision table is a sparse decision table, wherein the determining is performed so that subsequent to insertion of the row for insertion into the decision table, each row of the decision table is capable of being fired.

* * * * *